United States Patent [19]

Cadorniga et al.

[11] Patent Number: 5,321,089

[45] Date of Patent: Jun. 14, 1994

[54] GOLF BALL COVER

[75] Inventors: Lauro C. Cadorniga, Piedmont; Frank M. Simonutti, Anderson, both of S.C.

[73] Assignee: Dunlop Slazenger Corporation, Greenville, S.C.

[21] Appl. No.: 39,902

[22] Filed: Mar. 30, 1993

[51] Int. Cl.$^5$ .................. A63B 37/12; C08L 23/26; C08L 33/02

[52] U.S. Cl. .................. 525/196; 525/221; 273/235 R

[58] Field of Search .............. 273/235 R; 525/221, 525/196

[56] References Cited

U.S. PATENT DOCUMENTS

| | | | |
|---|---|---|---|
| 2,074,803 | 3/1937 | Rickey | 154/18 |
| 2,322,140 | 6/1943 | Kalowski | 18/56 |
| 3,365,520 | 1/1968 | Foster et al. | 260/897 |
| 3,490,770 | 1/1970 | Satchell et al. | 273/231 |
| 3,789,035 | 1/1974 | Iwami et al. | 260/78.5 T |
| 4,323,247 | 4/1982 | Keches et al. | 273/235 R |
| 4,801,649 | 1/1989 | Statz | 525/183 |
| 4,838,556 | 6/1989 | Sullivan | 273/220 |
| 4,884,814 | 12/1989 | Sullivan | 273/235 R |
| 4,911,451 | 3/1990 | Sullivan | 273/235 R |
| 4,943,332 | 7/1990 | Sakaguchi et al. | 156/146 |
| 4,956,414 | 9/1990 | Muehlenbernd et al. | 525/196 |
| 5,033,749 | 7/1991 | Kakiuchi | 273/227 |
| 5,187,013 | 2/1993 | Sullivan | 273/235 R |

FOREIGN PATENT DOCUMENTS

| | | |
|---|---|---|
| 58-217533 | 12/1983 | Japan . |
| 3-71148 | 11/1991 | Japan . |
| 645311 | 10/1950 | United Kingdom . |
| 655525 | 7/1951 | United Kingdom . |
| 1209316 | 10/1970 | United Kingdom . |
| 1383422 | 2/1975 | United Kingdom . |
| 2032286 | 5/1980 | United Kingdom . |

*Primary Examiner*—Carman J. Seccuro, Jr.
*Attorney, Agent, or Firm*—Lorusso & Loud

[57] ABSTRACT

A composition useful to produce a golf ball cover of a blend of ethylene-methyl acrylate and an ionomer resin and a compatabilizer. The composition produces a cover material having hardness and feel comparable to Balata, but having improved resilience, durability and cut resistance over Balata.

8 Claims, No Drawings

GOLF BALL COVER

BACKGROUND OF THE INVENTION

This invention relates in general to golf balls and, more particularly, to a golf ball having an improved cover material.

The assembly of a golf ball generally involves molding a cover around a solid or wound core. Golf balls with wound cores are typically referred to as "three piece" balls because they consist of three basic components: (1) a solid or liquid-filled center; (2) rubber winding around the center, and (3) the cover. Similarly, solid cores are referred to as having a "two piece" construction, since they consist solely of a solid core and a cover. A third type of ball, known as a "one-piece" ball is also known in the art. As the name suggests, one piece balls are solid balls of homogeneous construction made by any conventional molding method suitable for the purpose.

The composition of the golf ball cover has proven to be a factor in overall golf ball performance. Historically, three piece balls had covers made of Balata, a natural resin obtained from trees in South and Central America and is essentially made up of transpolyisoprene.

Balata is still used today as a cover material because of the "click" and "feel" provided by the balata cover to the golfer. "Click" is the sound made by a golf club head when it hits the ball. "Feel" is the overall sensation transmitted to the golfer after hitting the ball. Balata covered golf balls are also used because of the excellent playability and good flight performance qualities. These balls give good flight distance and skilled golfers can impart desirable spin to the ball, enabling it to draw or fade in flight. Also, especially with high-lofted clubs, the backspin allows the ball to stop abruptly on approach shots.

However, balata type materials are expensive and the manufacturing procedures required are time-consuming, labor-intensive and therefore expensive.

The majority of modern golf balls use a two piece construction with covers made of a durable synthetic thermoplastic resin such as Surlyn, a product of E. I. DuPont de Nemours Company, Incorporated. Synthetic thermoplastic cover materials have been used with limited success. They are durable and produce satisfactory flight distance. Additionally, they are less costly to manufacture than balata covers. However, these materials are hard and therefore lack the "click" and "feel" of a balata ball. Moreover, it is not possible to impart to such balls the desirable spin characteristics required by skilled golfers. It is desirable, however, to utilize a synthetic cover material for improved process manufacturing and to increase desirability and resilience performance.

In an attempt to overcome the negative factors of the hard ionomer covers, DuPont introduced low modulus SURLYN ionomers in the early 1980's. These SURLYN ionomers have a flexural modulus of from about 3000 to about 7000 PSI and a hardness of from 25 to about 40 as measured on the Shore D scale - ASTM 2240. The low modulus ionomers are terpolymers of ethylene, methacrylic acid and n- or iso-butylacrylate, neutralized with sodium and zinc cations. E. I. DuPont De Nemours & Company has disclosed that the low modulus ionomers can be blended with other grades of previously commercialized ionomers of high flexural modulus of from about 30,000 to 55,000 PSI to produce balata-like properties.

The low modulus ionomers when used without blends produced covers with very similar physical properties to those of balata, including poor cut resistance. Worse, such covers tend to go "out-of-round" quicker than balata covers. Blending with hard SURLYN ionomers was found to improve these properties.

However, the relatively high cost of the soft SURLYN ionomers, together with the need to blend several grades of hard and soft ionomers to achieve the desired properties, militates against the use of soft/hard ionomer blends in the commercial manufacture of a golf ball.

Accordingly, it is an object of the present invention to provide a golf ball having a synthetic cover material.

Another object of the present invention is to provide an improved synthetic cover material for a golf ball.

It is another object of the present invention to provide a golf ball having a synthetic cover material that achieves the click, feel, playability and flight performance qualities of Balata covered golf balls.

A further object of the present invention is to provide a golf ball having a cover material that has improved process manufacturing as well as durability and resilience.

SUMMARY OF THE INVENTION

The present invention is a cover material for a golf ball, especially a three piece liquid center golf ball. The cover material includes ethylene-methyl acrylate (E-MA) blended with an ionomer resin, such as SURLYN and a compatabilizer. The result is a golf ball cover with cover hardness and feel comparable to balata, but yielding improved resilience, durability and cut resistance over balata.

These and other objects and features of the present invention will be apparent from a reading of the following detailed description of the invention.

DETAILED DESCRIPTION OF THE INVENTION

The cover composition of the present invention includes blends of Ethylene-Methyl Acrylate (E-MA) with an ionomer resin and a compatabilizer.

For the purpose of the present invention, E-MA is defined as a copolymer of 65-94% by weight of ethylene and 35-6% by weight methyl-acrylate. Suitable for use in the present invention are Optema ® copolymers, a trademark of Exxon Chemical Company of Houston, Tex. for ethylene methyl acrylate (EMA) copolymers. Three versions of Optema ® are useful in the present invention and have the following physical properties:

| Material | % M.A. | Flexural Modulus | Shore D | M.I. |
| --- | --- | --- | --- | --- |
| Optema XS 11.04 | 6.5 | 19,500 psi | 45 | 6.0 g/10 min |
| Optema XS 55.08 | 27.0 | 2,825 psi | 28 | 5.0 g/10 min |
| Optema XS 53.04 | 35.0 | 3,020 psi | 17 | 4.0 g/10 min |

M.I. = melt index using test methods according to ASTM D 1238.

The term "ionomer resin" as used herein means a copolymer of ethylene with a metal salt of methacrylic acid, a metal salt of acrylic acid or a mixture thereof. Preferred metal salts are those of lithium, sodium, zinc and magnesium. Specifically, the ionomer resin will be a copolymer of 75-95% of an olefin, preferably ethylene, and 5-25% of an alpha, beta, ethnically unsaturated carboxylic acid, such as acrylic or methacrylic acid, with 10%-90% of the carboxylic acid groups being neutralized with sodium, zinc, lithium or magnesium ions. For example, Surlyn, available from E. I. DuPont deNemours Company, Incorporated of Wilmington, Del. is acceptable for use in the present invention as the ionomer resin. Also suitable is Iotek resin, available from Exxon Chemical Company of Houston, Tex.

Certain ionomer resins useful in the present invention have the following physical properties:

| Material | Acid Type | Ion Type | % Acid | Flex Modulus | Shore "D" |
|---|---|---|---|---|---|
| Surlyn 8240 | MAA | Na | 20 | 75,000 | 75 |
| Surlyn 8920 | MAA | Na | 15 | 55,000 | 66 |
| Surlyn 9910 | MAA | Zn | 15 | 48,000 | 64 |
| Surlyn AD 8172 | MAA | Mg | 15 | 44,000 | 61 |
| Surlyn 7940 | MAA | Li | 15 | 61,000 | 68 |
| Iotek 8030 | AA | Na | 15 | 49,000 | 59 |
| Iotek 7010 | AA | Zn | 15 | 26,000 | 57 |

Acid type:
MAA - Methacrylic Acid
AA - Acrylic Acid

In a preferred embodiment, the cover material of the present invention includes 30-90% ethylene-methyl acrylate copolymer, consisting of 94-65% by weight of ethylene and 6-35% by weight of methyl-acrylate, having a flexural modulus of 2,800-19,000 psi, Shore "D" hardness of 17-45 and melt flow index of 0.7-20.0 g/10 min; and 70-10% of an ionomer resin containing 95-75% by weight of ethylene and 5-25% by weight of a carboxylic acid, 10-90% of which are neutralized with one of the metal ions Na, Zn, Li, or Mg, having a flexural modulus of 10,000-90,000 psi, and a melt index of 0.5-5.0 g/10 min.

Preferably, the blend for the cover material of the present invention includes a compatabilizer to improve the miscibility of the E-MA/Ionomer blend. The compatabilizer shall consist of a copolymer containing 80-95% by weight of an olefin, preferably ethylene, 20-5% by weight of an alpha, beta ethnically unsaturated carboxylic acid, preferably acrylic or methacrylic acid, and possibly containing a small amount of an n-alkyl acrylate, such as n-butyl acrylate. A suitable compatabilizer is Escor ®, a trademark of Exxon Chemical Company of Houston, Tex. for a terpolymer of ethylene, acrylic acid and n-butyl acrylate having the following physical properties:

| Material | Flex Modulus | Shore "D" | M.I. |
|---|---|---|---|
| Escor ATX 310 | 11,700 | 44 | 6.0 g/10 min. |

For blends of the cover material that include a compatabilizer, a preferred embodiment is:
30 to 90 php of EMA
10 to 70 php of ionomer resin
5 to 15 php of compatabilizer—copolymer/terpolymer.

It may be desirable for the cover material of the present invention to include a colorant. The colorant may be present in the composition in an amount up to 5 parts per hundred polymer (p.h.p.) of the composition. Typically, the colorant will consist of titanium dioxide, ultramarine blue, ultramarine violet and an ionomeric carrier. A suitable colorant is available from AMERICHEM Inc. of Cuyahuga, Ohio.

The blends are made and produced into a golf ball cover by processes known in the art for producing golf ball covers, processes such as extrusion molding or injection molding. It is within the skill of those in this field to produce a blend from the components of the present invention.

The present invention will be described by way of the following examples, which are provided for illustration but are not to be considered as limiting. A control example was included, ID No. 12 consisting of a Maxfli HT-90 balata covered golf ball, for comparison purposes.

TABLE I

| ID | BLEND | (a) SIZE | (b) PGA | (c) WEIGHT | (d) SHORE D | (e) REB | (f) COR | (g) DUR |
|---|---|---|---|---|---|---|---|---|
| 1 | Optema XS11.04/ Surlyn 8240 @ 30/70 | 1.6828 | 88 | 45.46 | 62 | 71.8 | 0.730 | 159 |
| 2 | Optema XS11.04/ Surlyn 8240 @ 50/50 | 1.6800 | 84 | 45.13 | 58 | 70.5 | 0.726 | 182 |
| 3 | Optema XS11.04/ Surlyn 8240 @ 70/30 | 1.6811 | 83 | 45.12 | 52 | 70.1 | 0.725 | 170 |
| 4 | Optema XS11.04/ Surlyn 8240 @ 90/10 | 1.6797 | 81 | 44.75 | 49 | 68.8 | 0.724 | 145 |
| 5 | Optema XS55.08/ Surlyn 8240 @ 30/70 | 1.6843 | 86 | 45.56 | 60 | 72.8 | 0.737 | 181 |
| 6 | Optema XS55.08/ Surlyn 8240 @ 50/50 | 1.6828 | 81 | 45.39 | 51 | 71.2 | 0.731 | 173 |
| 7 | Optema XS55.08/ Surlyn 8240 @ 70/30 | 1.6820 | 82 | 45.47 | 47 | 71.8 | 0.734 | 160 |
| 8 | Optema XS55.08/ Surlyn 8240 @ 90/10 | 1.6805 | 77 | 45.34 | 37 | 70.8 | 0.733 | 100* |
| 9 | Optema XV53.04/ Surlyn 8240 @ 30/70 | 1.6848 | 86 | 45.57 | 57 | 72.8 | 0.738 | 168 |
| 10 | Optema XV53.04/ Surlyn 8240 @ 50/50 | 1.6841 | 80 | 45.57 | 44 | 72.2 | 0.735 | 112* |
| 11 | Optema XV53.04/ Surlyn 8240 @ 70/30 | 1.6840 | 76 | 45.68 | 35 | 73.2 | 0.732 | 98* |
| 12 | Maxfli HT-90 | 1.6795 | 88 | 45.25 | 52 | 70.6 | 0.721 | — |

TABLE I-continued

| ID | BLEND | (a) SIZE | (b) PGA | (c) WEIGHT | (d) SHORE D | (e) REB | (f) COR | (g) DUR |
|---|---|---|---|---|---|---|---|---|
| | (control) | | | | | | | |

- 5% Americhem #33370-R2 color concentrate added to each blend.
- 10 phr Escor ATX added to each blend for compatiblization purposes.
- (a) Size = diameter in inches
- (b) PGA measures deformation under a fixed static load of 200 lbs
- (d) Shore D hardness, ASTM 2240
- (e) REB = rebound (inches) from 100-inch drop test
- (f) COR = coefficient of restitution = rebound velocity/forward velocity
- (g) DUR = durability, number of hits before mechanical failure of sample.

The following physical properties of compositions ID Nos. 1–11 were also measured:

TABLE II

| ID | TENSILE STRENGTH kg/cm$^2$ | ELONG. YIELD % | TENSILE BK, PSI | ELONG. BK, % | TENSILE MOD, PSI | FLEXURAL MOD, PSI |
|---|---|---|---|---|---|---|
| 1 | 2,315 | 11 | 2,858 | 227 | 26,305 | 53,139 |
| 2 | 1,793 | 10 | 2,468 | 270 | 20,510 | 34,299 |
| 3 | 1,288 | 9 | 1,753 | 254 | 14,655 | 23,435 |
| 4 | 930 | 8 | 1,420 | 425 | 9,857 | 15,167 |
| 5 | 1,842 | 13 | 3,462 | 351 | 22,175 | 44,703 |
| 6 | 1,433 | 9 | 2,285 | 286 | 15,561 | 27,603 |
| 7 | 746 | 13 | 1,692 | 413 | 6,240 | 10,071 |
| 8 | 372 | 18 | 961 | 616 | 2,027 | 2,196 |
| 9 | 2,067 | 13 | 3,048 | 279 | 22,996 | 48,214 |
| 10 | 1,266 | 9 | 1,796 | 198 | 13,101 | 24,655 |
| 11 | 718 | 14 | 1,411 | 308 | 5,075 | 10,418 |

-Tensile Yield, Elongation Yield, Tensile Break, Elongation Break and Tensile Modulus Tests performed according to ASTM procedure D-638.
-Flexural Modulus Testing performed according to ASTM D-790 procedure.

Balls having cover compositions of Examples 1 to 11 above were also tested for torsional modulus at various temperatures and the results are below:

TABLE III

| | TORSIONAL MODULUS (PSI) | | | | | |
|---|---|---|---|---|---|---|
| ID | −10° C. | 0° C. | 10° C. | 25° C. | 35° C. | −10° C. vs 35° C. |
| 1 | 27,451 | 27,805 | 19,251 | 13,499 | 10,516 | 16,935 |
| 2 | 22,498 | 16,874 | 12,816 | 9,353 | 6,466 | 16,032 |
| 3 | 17,209 | 13,089 | 9,053 | 6,552 | 4,777 | 12,432 |
| 4 | 3,681 | 10,046 | 7,138 | 4,405 | 3,375 | 10,306 |
| 5 | 18,408 | 15,819 | 13,499 | 11,301 | 8,037 | 10,371 |
| 6 | 12,289 | 11,068 | 8,670 | 6,129 | 4,053 | 8,236 |
| 7 | 5,360 | 3,724 | 2,734 | 2,351 | 1,268 | 4,092 |
| 8 | 2,584 | 1,755 | 1,267 | 839 | 527 | 2,057 |
| 9 | 21,724 | 18,951 | 15,905 | 12,559 | 9,358 | 12,366 |
| 10 | 12,736 | 7,710 | 4,812 | 2,985 | 2,127 | 10,609 |
| 11 | 3,883 | 2,888 | 2,089 | 1,504 | 1,001 | 2,882 |

- Torsional modulus testing performed according to ASTM D-1043 procedure.

Three piece wound golf balls having covers made from the compositions of Examples 1 to 12 above were driven by a TRUE TEMPER machine and measured for carry, total distance and trajectory. The results are given below.

TABLE IV

| ID | (a) CARRY | (b) TOTAL | (c) REAR TRAJ | (d) DISP/ACCY | (e) I.V. |
|---|---|---|---|---|---|
| 1 | 252.8 | 266.7 | 7.7 | 4.6 R/176 | 235.4 |
| 2 | 246.9 | 260.7 | 7.8 | 2.9 R/196 | 234.7 |
| 3 | 249.4 | 261.1 | 7.9 | 2.9 R/263 | 234.7 |
| 4 | 249.4 | 258.0 | 8.2 | 4.1 R/276 | 234.6 |
| 5 | 254.7 | 267.2 | 7.9 | 3.6 R/285 | 235.6 |
| 6 | 252.1 | 260.1 | 8.3 | 6.1 R/226 | 235.2 |
| 7 | 250.7 | 256.4 | 8.4 | 6.5 R/305 | 235.8 |
| 8 | 250.2 | 254.1 | 9.1 | 9.2 R/171 | 235.7 |
| 9 | 254.5 | 264.6 | 8.0 | 4.8 R/116 | 235.5 |
| 10 | 254.0 | 261.3 | 8.5 | 5.3 R/91 | 235.6 |
| 11 | 253.4 | 260.0 | 8.7 | 6.7 R/135 | 235.8 |
| 12 | 247.6 | 260.6 | 7.7 | 7.9 R/239 | 232.9 |

- Driver club used was Tour Ltd Metal Wood with 8.5° loft.
- Club head velocity was constant @ 161.8 - 163.1 ft/sec.
- (a), (b) Measured in yards
- (c) Measured by observing rearpeak trajectory using adapted trajectory boards similar to those of the US Golf Association.
- (d) Dispersion/Accuracy
- (e) Initial Velocity (in ft/sec) of the ball when struck by a driver.

Balls having covers of the compositions of Examples 1 to 12 above were tested for spin-rate at various launch angles using a Driver, No. 5 iron and pitching wedge. Spin rate was measured by observing the ball in flight using stop action strobe photography and the results are given below.

TABLE V

| | DRIVER | | 5-IRON | | PITCHING WEDGE | |
|---|---|---|---|---|---|---|
| ID | L.A. | SPIN | L.A. | SPIN | L.A. | SPIN |
| 1 | 9.3 | 3,767 | 18.7 | 6,134 | 18.3 | 7,425 |
| 2 | 9.1 | 3,914 | 18.7 | 6,072 | 18.4 | 7,803 |
| 3 | 9.3 | 3,983 | 19.0 | 6,153 | 16.5 | 8,898 |
| 4 | 9.1 | 4,036 | 19.2 | 6,319 | 15.6 | 9,316 |
| 5 | 9.2 | 3,789 | 19.5 | 6,350 | 16.1 | 8,704 |
| 6 | 9.3 | 4,237 | 19.5 | 6,706 | 14.8 | 9,509 |
| 7 | 9.1 | 4,284 | 19.2 | 7,178 | 14.0 | 9,417 |
| 8 | 9.0 | 4,736 | 18.7 | 7,545 | 14.8 | 9,134 |
| 9 | 8.9 | 3,883 | 19.3 | 6,267 | 17.7 | 8,217 |
| 10 | 8.8 | 4,175 | 18.5 | 7,042 | 12.8 | 9,067 |
| 11 | 9.1 | 4,500 | 18.3 | 7,631 | 15.4 | 9,070 |
| 12 | 9.6 | 3,808 | 19.8 | 5,861 | 17.2 | 8,920 |

- Driver clubs used: Tour Ltd. Metal Wood with 8.5° loft
- 5-iron club used: Tour Ltd. 5-Iron with 28° loft
- Pitching Wedge club used: Tour Ltd. Pitching Wedge with 50° loft Balls having cover compositions of Examples 1 to 11 above and having the torsional modulus values shown in Table III were tested for loss of properties over temperature changes and the results are below. Values calculated represent the loss in torsional modulus against previous temperature value.

TABLE VII

IMPACT DEFLECTION STUDY

| ID NO | TEMP. 125 | 0° C. 150 | CHNG. | TEMP. 125 | 10° C. 150 | CHNG. | TEMP. 125 | 25° C. 150 | CHNG. | TEMP. 125 | 35° C. 150 | CHNG. |
|---|---|---|---|---|---|---|---|---|---|---|---|---|
| 1 | 1 1/32 | 1 1/32 | 0 | 1 1/16 | 1 1/16 | 0 | 1 3/32 | 1 5/32 | +1/16 | 1 5/32 | 1 ⅛ | −1/32 |
| 2 | 1 | 1 1/32 | +1/32 | 1 1/32 | 1 1/32 | 0 | 1 ⅛ | 1 5/32 | +1/32 | 1 ⅛ | 1 5/32 | +1/32 |
| 3 | 1 1/32 | 1 1/32 | 0 | 1 3/32 | 1 1/16 | −1/32 | 1 5/32 | 1 5/32 | 0 | 1 5/32 | 1 3/16 | +1/32 |
| 4 | 1 1/16 | 1 ⅛ | +1/16 | 1 1/16 | 1 1/16 | 0 | 1 ⅛ | 1 3/16 | +1/16 | 1 5/32 | 1 5/32 | 0 |
| 5 | 1 | 1 1/32 | +1/32 | 1 3/32 | 1 1/16 | −1/32 | 1 ⅛ | 1 5/32 | +1/32 | 1 5/32 | 1 5/32 | 0 |
| 6 | 1 1/16 | 1 1/16 | 0 | 1 ⅛ | 1 ⅛ | 0 | 1 3/16 | 1 ⅛ | +1/16 | 1 ⅛ | 1 ⅛ | 0 |
| 7 | 1 3/32 | 1 1/16 | −1/32 | 1 5/32 | 1 ⅛ | −1/32 | 1 7/32 | 1 7/32 | 0 | 1 9/32 | 1 5/16 | +1/32 |
| 8 | 1 3/32 | 1 3/32 | 0 | 1 ⅛ | 1 ⅛ | 0 | 1 3/16 | 1 ⅛ | +1/16 | 1 7/32 | 1 ⅛ | +1/32 |
| 9 | 1 1/16 | 1 1/16 | 0 | 1 3/32 | 1 3/32 | 0 | 1 ⅛ | 1 7/32 | +3/32 | 1 3/16 | 1 3/16 | 0 |
| 10 | 1 ⅛ | 1 3/32 | −1/32 | 1 ⅛ | 1 5/32 | +1/32 | 1 7/32 | 1 7/32 | 0 | 1 9/32 | 1 9/32 | 0 |
| 11 | 1 ⅛ | 1 5/32 | +1/32 | 1 5/32 | 1 ⅛ | +3/32 | 1 ⅛ | 1 5/16 | +1/16 | 1 11/32 | 1 9/32 | −1/16 |
| 12 | 1 1/32 | 1 1/32 | 0 | 1 1/16 | 1 1/32 | −1/32 | 1 ⅛ | 1 7/32 | +3/32 | 1 3/16 | 1 5/32 | −1/32 |

TABLE VI

| ID | −10° C. | 0° C. | 10° C. | 25° C. | 35° C. | −10° C. to 35° C. OVERALL LOSS |
|---|---|---|---|---|---|---|
| 1 | — | 16.9% | 15.6% | 29.9% | 22.1% | 61.7% |
| 2 | — | 25.0% | 24.0% | 27.0% | 30.9% | 70.5% |
| 3 | — | 23.9% | 30.8% | 27.6% | 27.1% | 72.2% |
| 4 | — | 26.6% | 28.9% | 38.3% | 23.4% | 75.3% |
| 5 | — | 14.1% | 14.7% | 16.3% | 28.9% | 56.3% |
| 6 | — | 9.9% | 21.7% | 29.3% | 33.9% | 67.0% |
| 7 | — | 30.5% | 26.6% | 14.0% | 46.1% | 76.3% |
| 8 | — | 32.1% | 27.8% | 33.8% | 37.2% | 79.6% |
| 9 | — | 12.8% | 16.1% | 21.0% | 25.5% | 56.9% |
| 10 | — | 39.4% | 37.6% | 38.0% | 28.7% | 83.3% |
| 11 | — | 25.6% | 27.7% | 28.0% | 33.4% | 74.2% |

Each of the compositions ID No. 1–11 and the Maxfli HT Balata (12) were then the subject of an impact deflection study, testing procedures completed in accordance with Dunlop golf standards. The results are below:

Blends I.D. Nos. 1–11 shown in Table I all contain 30–90% ethylene-methyl acrylate with 70–10% ionomer. These blends show significantly improved durability and COR versus the Example ID No. 12, the prior art Balata control. Table IV illustrates the carry distance and initial velocity improvements during flight testing vs. Maxfli HT control. Table V illustrates spin comparativeness of E-MA/ionomer blends with respect to Balata control.

Other blends were prepared and tested for various physical properties as follow:

TABLE VIII

| | BLEND # | | | |
|---|---|---|---|---|
| | 13 | 14 | 15 | 16 |
| Optema XS 11.04 | 70 | 70 | 70 | 70 |
| Surlyn 8240 | 30 | 30 | 30 | 30 |
| Escor ATX 310 | 5 | 10 | 15 | — |
| Americhem #33370-R2 CC | 5 | 5 | 5 | 5 |
| Physical Properties | | | | |
| ASTM D-638 Tensile yield, psi | 1,500 | 1,500 | 1,400 | 1,500 |
| ASTM D-638 Tensile break, psi | 1,300 | 1,300 | 1,400 | 1,400 |
| ASTM D-638 Elongation yield, % | 70 | 80 | 90 | 60 |
| ASTM D-638 Elongation break, % | 170 | 200 | 240 | 90 |
| ASTM D-790 Flexural modulus, psi | 30,300 | 29,000 | 28,300 | 30,100 |

Example blends I.D. Nos. 13–16 (Table VIII) demonstrate the effective need of a compatabilizer in E-MA/ionomer blends. Blends I.D. Nos. 13–15 contain 5–15 phr Escor compatibilizing copolymer, while blend 16 contains only the E-MA/ionomer blend. Physical property testing results show blend No. 16 yields significant decrease in elongation break vs. blends No. 13–15. This indicates a separation of materials if compatabilizer is not present.

TABLE IX

| | BLEND # | | | | |
|---|---|---|---|---|---|
| | 17 | 18 | 19 | 20 | 21 |
| Optima XS 11.04 | 100 | 80 | 75.0 | 66.7 | 50.0 |
| Surlyn 8240 | | 20 | 24.0 | 33.3 | 50.0 |
| Escor ATX 310 | | | 10 | 11.1 | 11.1 | 11.1 |
| Americhem #33370-R2 CC | 5 | 5 | 5.0 | 5.0 | 5.0 |
| Physical Properties | | | | | |
| ASTM D-638 Tensile Yield, psi | | 1,300 | | 1,500 | |
| ASTM D-638 Tensile Break, psi | 1,740 | 1,200 | | 1,400 | |
| ASTM D-638 Elongation yield, % | | 90 | | 50 | |
| ASTM D-638 Elongation Break, % | 1,400 | 310 | | 210 | |
| ASTM D-790 Flexural Modulus, psi | 19,500 | 23,600 | | 28,000 | |
| Golf Ball Properties | | | | | |
| PGA Compression | 84 | 85 | 88 | 89 | 91 |
| Shore "D" Hardness | 46 | 51 | 51 | 53 | 54 |
| C.O.R. | 0.729 | 0.737 | 0.741 | 0.743 | 0.745 |

TABLE IX-continued

| | BLEND # | | | | |
|---|---|---|---|---|---|
| | 17 | 18 | 19 | 20 | 21 |
| Durability | 267 | 177 | 152 | 172 | 181 |

TABLE X

| | BLEND # | | | | | | | |
|---|---|---|---|---|---|---|---|---|
| | 22 | 23 | 24 | 25 | 26 | 27 | 28 | 29 |
| Optima XS 11.04 | 50 | 50 | 50 | 50 | 50 | 50 | 50 | 50 |
| Surlyn 8240 | 50 | | | | | | | |
| Surlyn 8920 | | 50 | | | | | | |
| Surlyn 9910 | | | 50 | | | | | |
| Surlyn AD 8172 | | | | 50 | | | | |
| Surlyn 7940 | | | | | 50 | | | |
| Iotek 8030 | | | | | | 50 | 50 | |
| Iotek 7010 | | | | | | | | 50 |
| Escor ATX 310 | 10 | 10 | 10 | 10 | 10 | | 10 | 10 |
| Americhem #33370-R2 CC | 5 | 5 | 5 | 5 | 5 | 5 | 5 | 5 |
| Golf Ball Properties | | | | | | | | |
| PGA Compression | 89 | 85 | 84 | 84 | 85 | 88 | 88 | 84 |
| Shore "D" Hardness | 54 | 54 | 54 | 54 | 54 | 55 | 54 | 50 |
| C.O.R. | 0.743 | 0.738 | 0.733 | 0.731 | 0.734 | 0.727 | 0.738 | 0.734 |
| Durability | 160 | 168 | 180 | 175 | 179 | 36 | 142 | 192 |

The E-MA/ionomer resin blends of the present invention yield comparable or improved coefficient of restitution properties compared to Balata covered golf balls. Moreover, these properties did not change as cover hardness changed.

Cover blends in the hardness range of 47-62 Shore "D" yield superior durability properties compared to Balata, in the range of 145-182 hits. This is comparable to a standard Surlyn covered golf ball. Cover blends with Shore "D" hardness in range of 35-47 yielded lower durability than a harder blend, but still yielded significantly improved durability in comparison with Balata covered balls.

Example ID No. 17 is a cover consisting of 100% ethylene-methyl acrylate. Ball properties are acceptable, however, cut resistance durability is significantly lower than blends containing the ionomer resin. Thus, the blends of present invention are shown to be superior to a cover of EMA alone.

Example blends ID Nos. 18-21 support observations regarding ID Nos. 1-11, covering ratio of ionomer from 20-50% by weight.

Example blends ID Nos. 22-26 cover usage of ionomers of methacrylic acid neutralized with Na, Zn, Li or Mg metal ions. All examples in this group yield desirable properties, comparable to Example ID No. 12 (prior art Balata). The present invention is therefore shown to be valid for all types of metal ion ionomers mentioned.

Example ID Nos. 27-28 further support the conclusions mentioned in Examples 13-16, regarding effectiveness of a compatabilizer. A significant decrease in both COR and ball durability are observed on Example ID No. 27, without compatabilizer.

Example ID Nos. 28-29 indicate that the present invention yields comparable properties to Example 12 (prior art Balata) when ionomer used contains acrylic acid as the carboxylic acid.

In short, the compositions of the present invention produce a cover for a golf ball that is cost effective to produce, and yet yields the playability and flight performance qualities of a Balata covered ball.

It will be appreciated that the instant specification and claims are set forth by way of illustration and not limitation and that various changes and modifications may be made without departing from the spirit and scope of the present invention.

What is claimed is:

1. A golf ball having a molded cover wherein the cover comprises a blend of:
    (a) 30-90% of a non-neutralized binary copolymer of 65-94% by weight ethylene and 35-6% by weight methyl-acrylate
    (b) 10-70% of a partially neutralized copolymer of 75-95% of an olefin and 5-25% of na alpha, beta, ethnically unsaturated carboxylic acid with 10-90% of the carboxylic acid groups being neutralized with a metal salt
    (c) 5-15 parts per hundred based on polymers (a) and (b) of a non-neutralized copolymer selected from a member of the group of copolymers consisting of a copolymer of 80-95% by weight ethylene and 20-5% by weight of a carboxylic acid and a terpolymer of 70-95% ethylene by weight, 20-5% by weight of a carboxylic acid and 25-0% by weight an alkyl-acrylate for compatabilization purposes.

2. The golf ball of claim 1 wherein in the blend said partially neutralized copolymer is selected from the group consisting of copolymers of ethylene with a metal salt of methacrylic acid, copolymers of ethylene with a metal salt of acrylic acid and mixtures of said copolymers.

3. The golf ball of claim 2 wherein in the blend said metal salt is selected from the group consisting of lithium salts, sodium salts, magnesium salts and zinc salts and said 4. The golf ball of claim 1 wherein the blend comprises 50% of polymer (a), 50% of the partially neutralized copolymer (b) and 10 parts per hundred of polymer (c).

5. The golf ball of claim 1 wherein the blend comprises 30% of polymer (a), 70% of the partially neutralized copolymer (b) and 10 parts per hundred of polymer (c).

6. The golf ball of claim 1 wherein the blend comprises 70% of polymer (a), 30% of the partially neutralized copolymer (b) and 10 parts per hundred of polymer (c).

7. The golf ball of claim 1 wherein the blend comprises 90% of polymer (a), 10% of the partially neutralized copolymer (b) and 10 parts per hundred of polymer (c).

8. The golf ball of claim 1 wherein in the blend said copolymer (c) comprises a terpolymer of ethylene, acrylic acid and n-butyl acrylate.

* * * * *

UNITED STATES PATENT AND TRADEMARK OFFICE
CERTIFICATE OF CORRECTION

PATENT NO. : 5,321,089
DATED : June 14, 1994
INVENTOR(S) : Lauro Cadorniga, Frank Simonutti It is certified that error appears in the above-indentified patent and that said Letters Patent is hereby corrected as shown below:

In the Claims;
Column 10; line 35; "na" should read "an"
Column 10; line 56; after "said" insert "unsaturated carboxylic acid is selected from the group consisting of methacrylic acid, acrylic acid and mixtures of said acids"

Column 5; Table III; line 42; "3,681" should read "13,681"

Table VII; under TEMP 125, Column "1/8" should read "1 1/8"

Table IX ; under blend #19; "24.0" should read "25"

Signed and Sealed this

Eighth Day of August, 1995

Attest:

BRUCE LEHMAN

Attesting Officer

Commissioner of Patents and Trademarks